(12) United States Patent
Weber et al.

(10) Patent No.: US 6,234,040 B1
(45) Date of Patent: May 22, 2001

(54) ROTATING, TRAVELING ENERGY ABSORBER FOR STEERING COLUMN

(75) Inventors: William Francis Weber, Bloomfield; Thomas Junior Luckett, Saline; Gregory Thomas Hedderly, White Lake; Patricia Kaye Kutsche, West Bloomfield, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/392,887

(22) Filed: Sep. 9, 1999

(51) Int. Cl.$^7$ ........................................................ B62D 1/18
(52) U.S. Cl. .............................. 74/493; 74/411.5; 74/492
(58) Field of Search ......................... 74/492, 493, 411.5; 280/777

(56) References Cited

U.S. PATENT DOCUMENTS

| | | |
|---|---|---|
| D. 256,018 | 7/1980 | Stone et al. . |
| D. 342,712 | 12/1993 | Emoto . |
| D. 363,053 | 10/1995 | Abele . |
| 1,795,567 | 3/1931 | Maurice . |
| 5,606,892 | 3/1997 | Hedderly . |
| 5,645,299 * | 7/1997 | Dies et al. ............................ 280/779 |
| 5,737,971 | 4/1998 | Riefe et al. . |
| 5,813,288 | 9/1998 | Simonetti . |
| 5,875,686 * | 3/1999 | Kinoshita et al. ...................... 74/492 |
| 5,979,265 * | 11/1999 | Kim et al. ............................. 280/777 |
| 6,099,038 * | 8/2000 | Jurik et al. ........................... 280/779 |

* cited by examiner

Primary Examiner—David Fenstermacher
(74) Attorney, Agent, or Firm—Brooks & Kushman P.C.

(57) ABSTRACT

A vehicle includes a receiver forming an aperture therein and having first and second gear racks at opposing sides of the aperture. A steering column armature assembly is received within the receiver aperture and includes first and second gears engaged with the first and second gear racks, respectively, in a manner to facilitate counter-rotation of the first and second gears as the steering column armature assembly is moved along the first and second gear racks. The first and second gears are selectively lockable together to prevent movement of the steering column armature assembly along the first and second gear racks. The first and second gears include an energy absorber positioned therebetween for dissipating energy when the first and second gears are forcibly displaced and counter-rotate with respect to each other in a high energy impact.

10 Claims, 17 Drawing Sheets

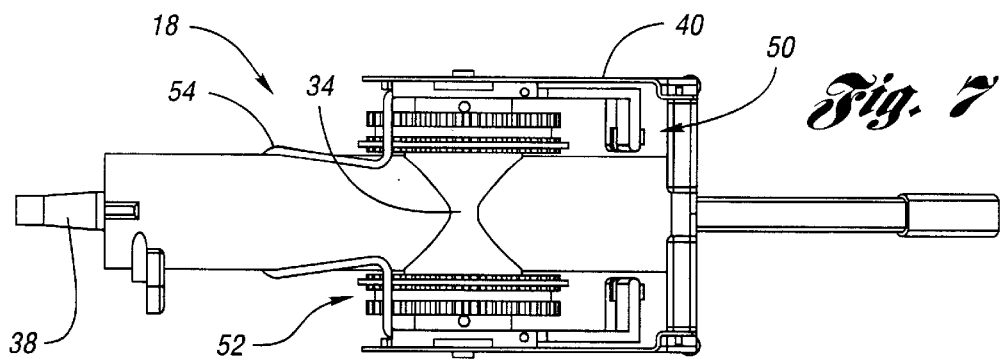
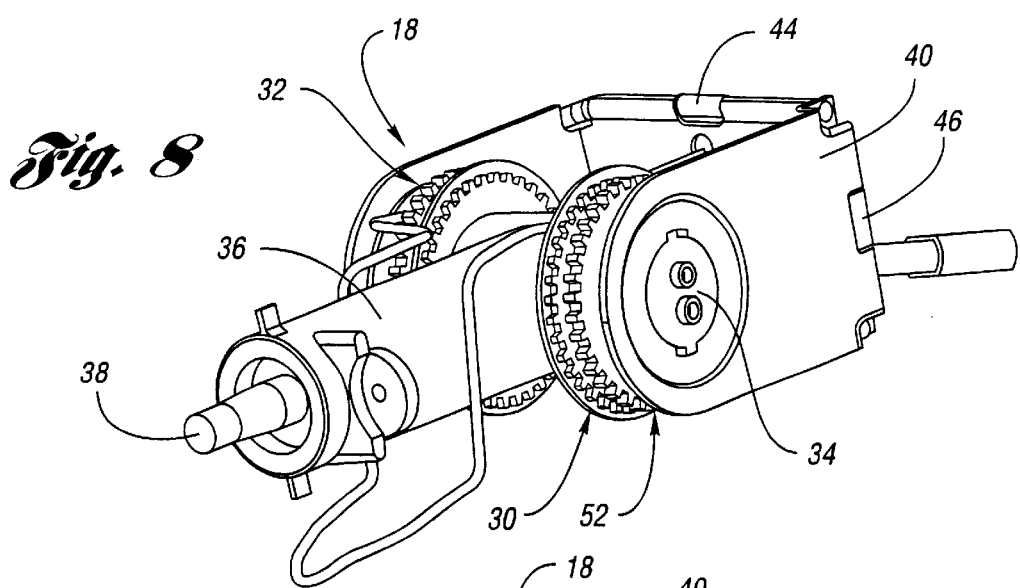
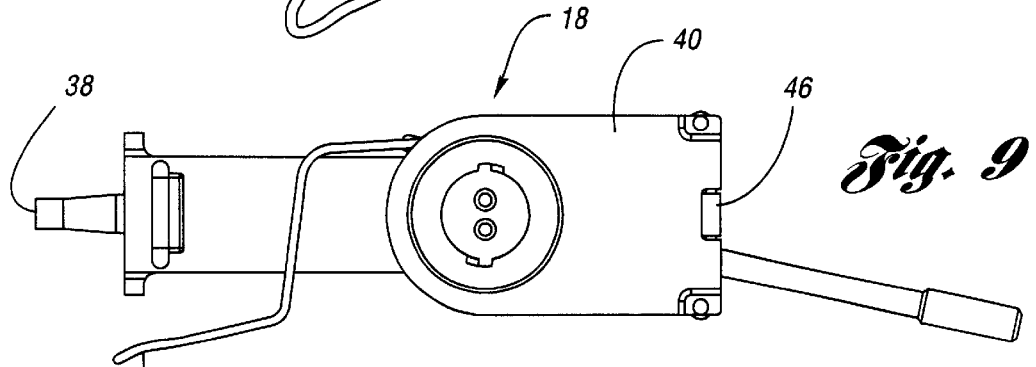
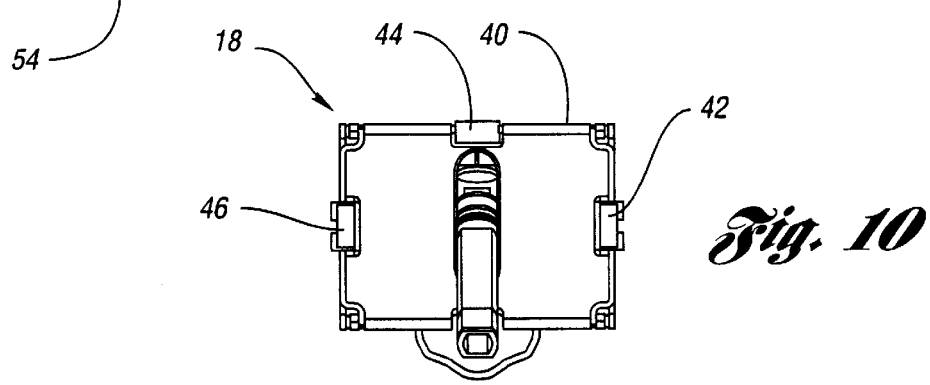

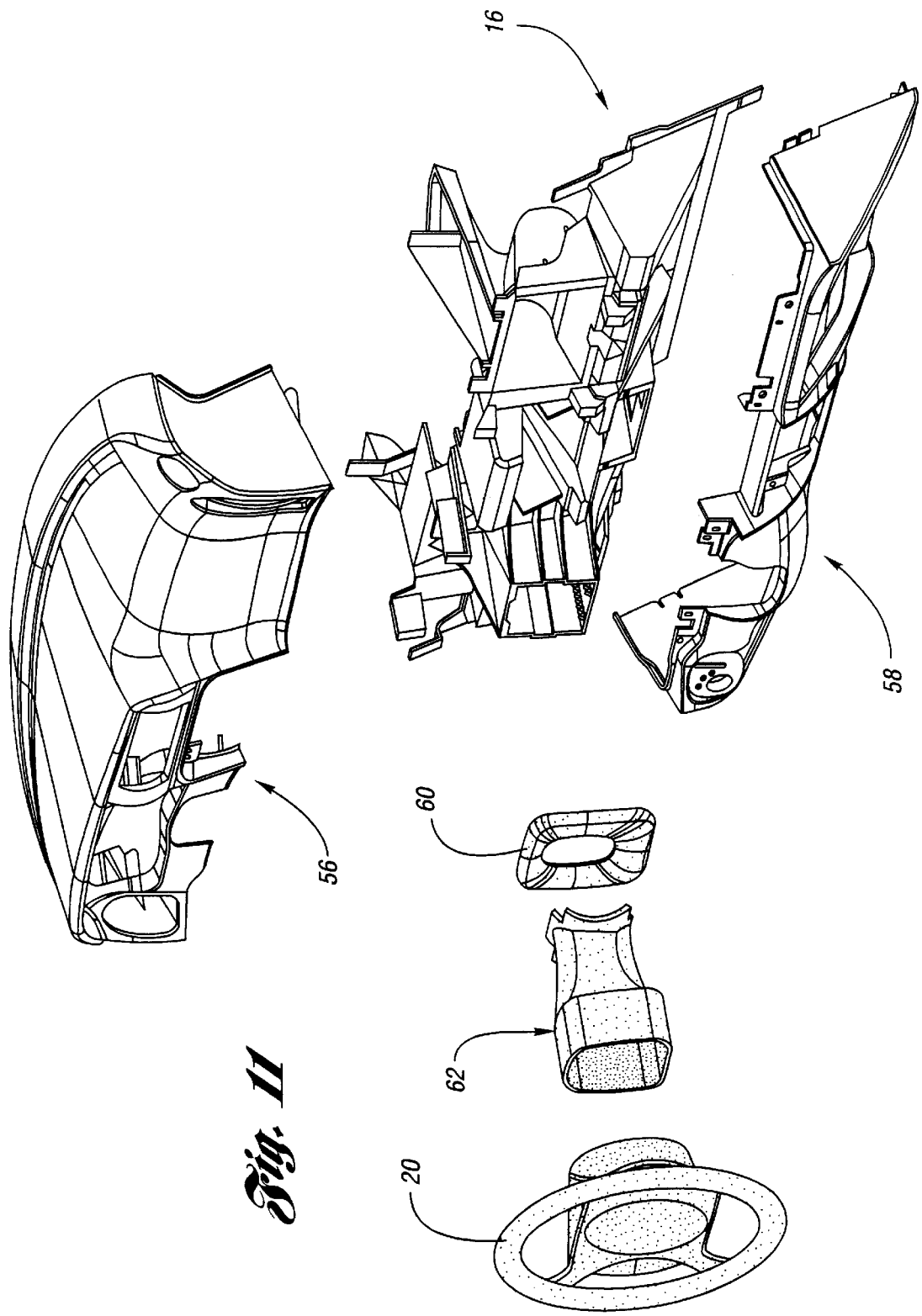

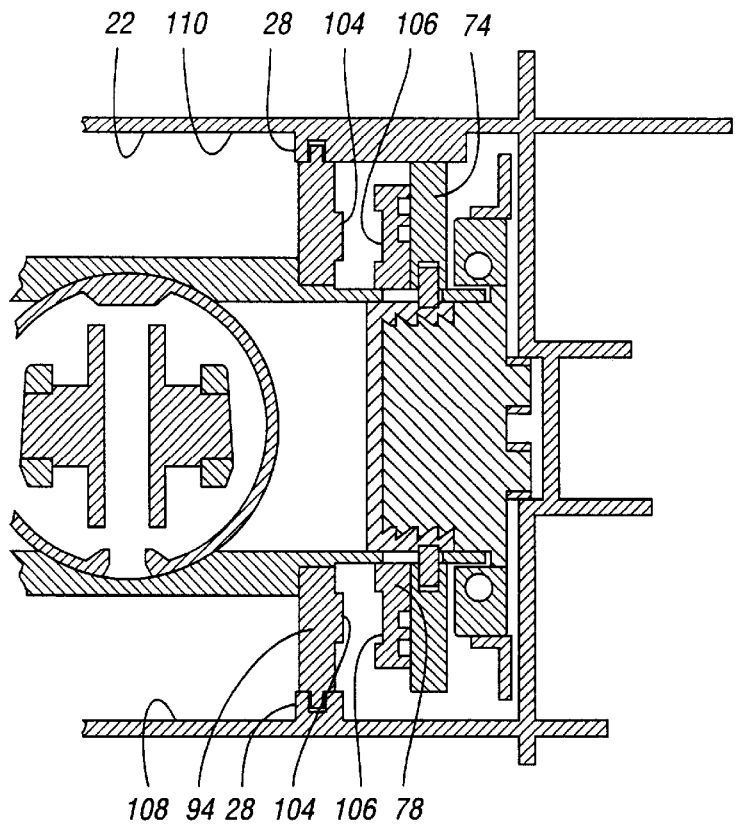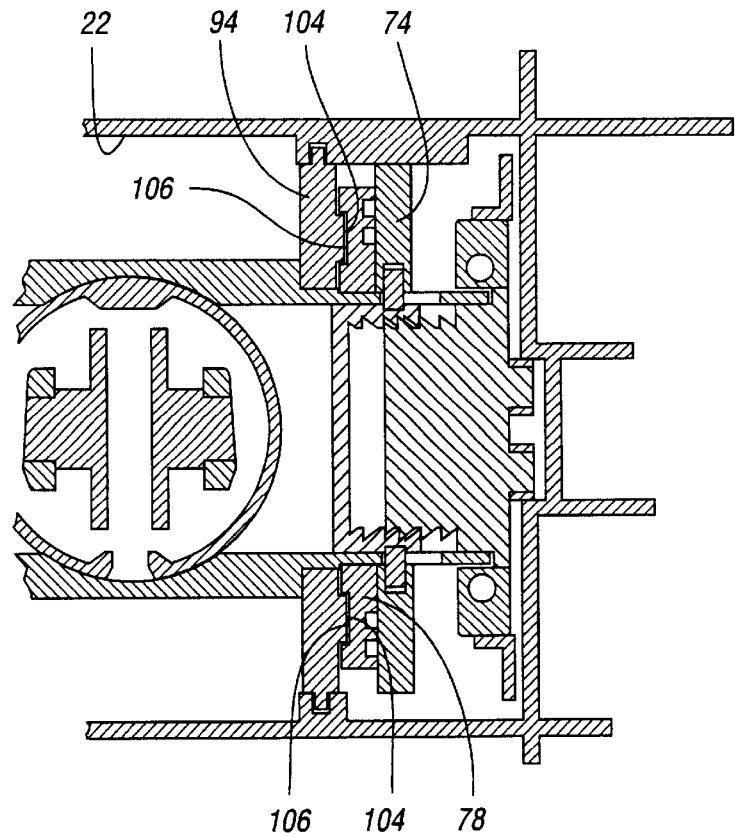

ROTATING, TRAVELING ENERGY ABSORBER FOR STEERING COLUMN

TECHNICAL FIELD

The present invention relates to a vehicle steering column assembly including a rotating, traveling energy absorber for energy dissipation in a high energy impact.

BACKGROUND OF THE INVENTION

Vehicle steering column assemblies often include energy dissipation features for dissipating energy when an axial force is applied to the steering column. Such energy dissipation assemblies typically include multiple components attached to the movable steering column and to the cross-car beam or instrument panel support structure. The energy dissipation component generally includes one or more deformable metal components which are deformed automatically when the steering column is forcibly collapsed.

Such assemblies may be labor-intensive and expensive to assemble as a result of the multiple components involved and the fact that the energy dissipation components associated with the steering column and the instrument panel support structure must be attached after installation of the steering column assembly into the vehicle. This adds difficulty and expense to the steering column assembly operation.

Accordingly, it is desirable to provide a simplified steering column assembly including an energy dissipation structure which does not require additional installation steps for assembly.

DISCLOSURE OF THE INVENTION

The present invention overcomes the above-referenced shortcomings of the prior art steering column assemblies by providing a steering column armature assembly including an integral rotating, traveling energy absorber which is installed with the steering column assembly into the vehicle, and does not require additional installation steps.

More specifically, the present invention provides a vehicle including a receiver forming an aperture therein and having first and second gear racks at opposing sides of the aperture. A steering column armature assembly is received within the receiver aperture and includes first and second gears engaged with the first and second gear racks, respectively, in a manner to facilitate counter-rotation of the first and second gears as the steering column armature assembly is moved along the first and second gear racks. The first and second gears are selectively lockable together to prevent movement of the steering column armature assembly along the first and second gear racks. The first and second gears include an energy absorber positioned therebetween for dissipating energy when the first and second gears are forcibly displaced and counter-rotate with respect to each other in a high energy impact.

Preferably, a clutch is positioned between the first and second gears, and the energy absorber comprises a pin extending from one of the gears and cooperating with a slot formed in the clutch. The slot has a width less than the width of the pin, whereby forced counter-rotation of the first and second gears causes the pin to be dragged through the slot which forcibly widens the slot, thus dissipating impact energy. The first and second gears are axially movable toward each other for locking and away from each other for unlocking. At least one of the first and second gears includes side teeth facing corresponding side teeth on the clutch for locking.

Accordingly, an object of the invention is to provide an improved vehicle steering column assembly including an energy absorber mechanism which is installed integrally with the steering column assembly and does not require additional manufacturing steps.

Other objects, features and advantages of the present invention are readily apparent from the following detailed description of the best mode for carrying out the invention when taken in connection with the accompanying drawings.

BRIEF DESCRIPTION OF THE DRAWINGS

FIG. 7 shows a plan view of a steering column armature assembly in accordance with the present invention;

FIG. 8 shows a perspective view of the assembly of FIG. 7;

FIG. 9 shows a side view of the assembly of the FIG. 7;

FIG. 10 shows an end view of the assembly of FIG. 7;

FIG. 11 shows an exploded perspective view of an instrument panel-assembly and cross-car beam in accordance with the present invention;

FIG. 18 shows a vertical cross-sectional view of the assembly of FIG. 16;

FIG. 19 shows a vertical cross-sectional view of the assembly of FIG. 17;

FIG. 25a shows a reverse partial perspective view of the armature of FIG. 25;

DETAILED DESCRIPTION OF THE PREFERRED EMBODIMENTS

Figure 1:
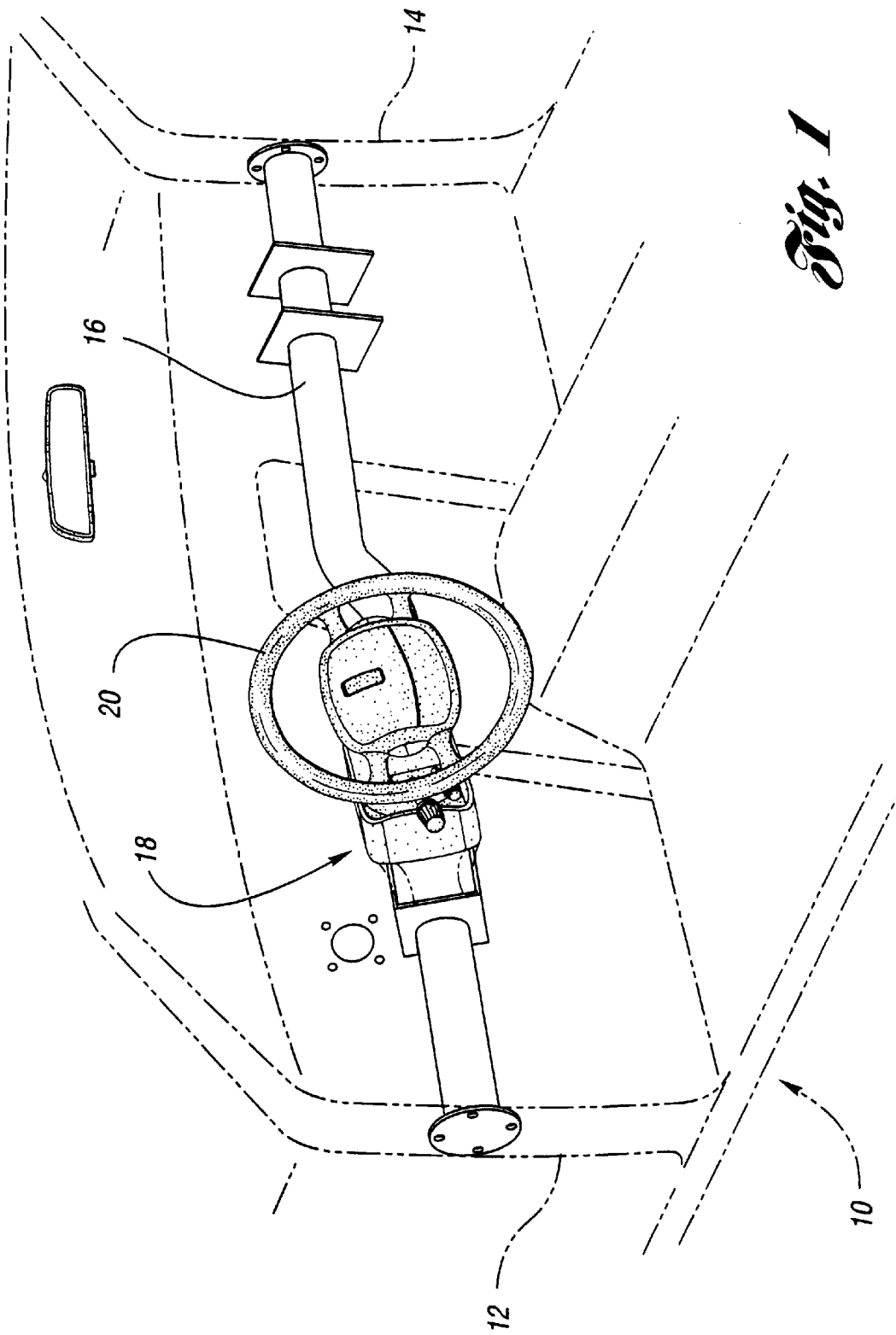
FIG. 1 shows a schematic perspective view of a cross-car beam and steering column assembly in accordance with the present invention.

FIG. 1 shows a schematic perspective view of a vehicle 10 in accordance with the present invention. The vehicle 10 includes A-pillars 12,14, with a cross-car beam 16 connecting the A-pillars 12,14. A steering column armature assembly 18 is integrated with the cross-car beam 16 for mounting a steering wheel 20 in the vehicle.

Figure 2:
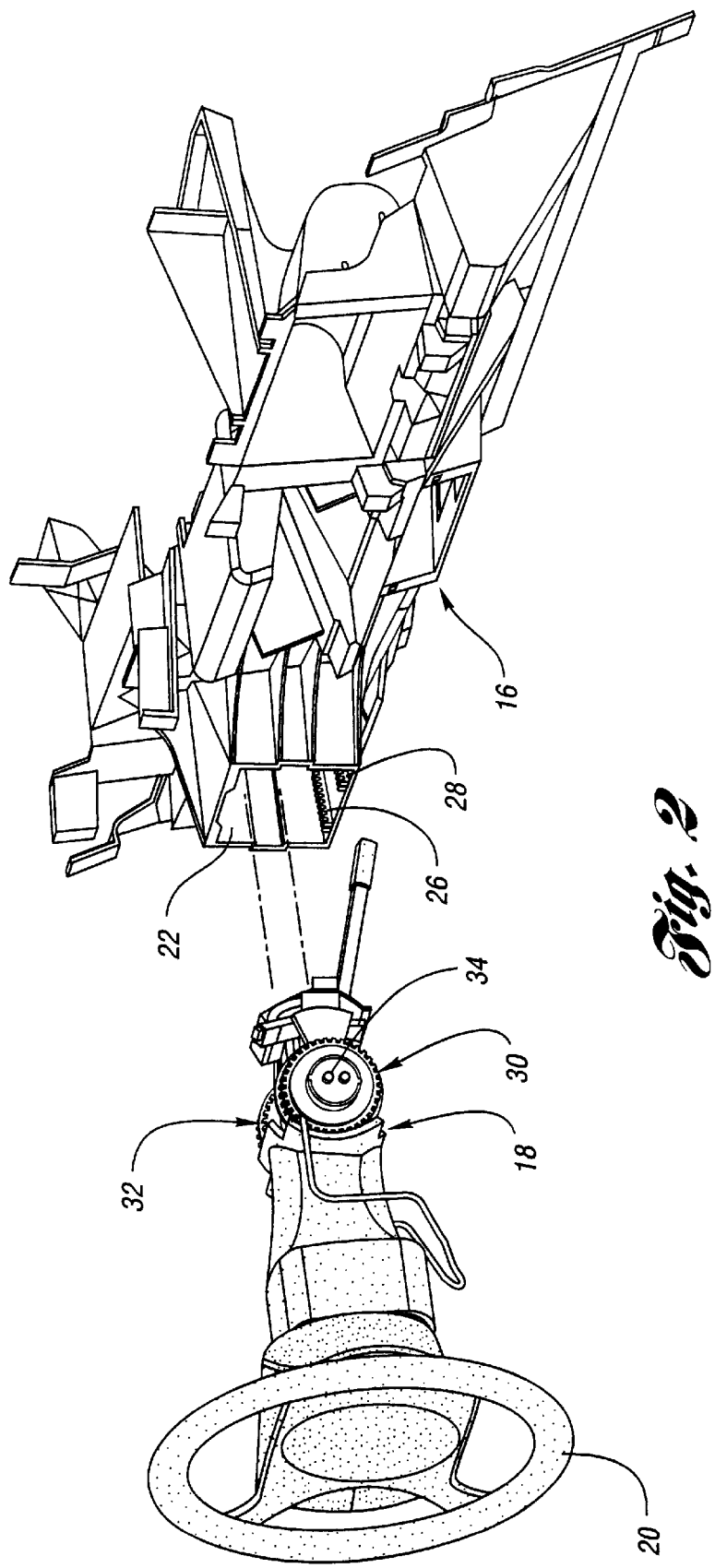
FIG. 2 shows an exploded perspective view of a cross-car beam and steering column assembly in accordance with the present invention.
Figure 3:
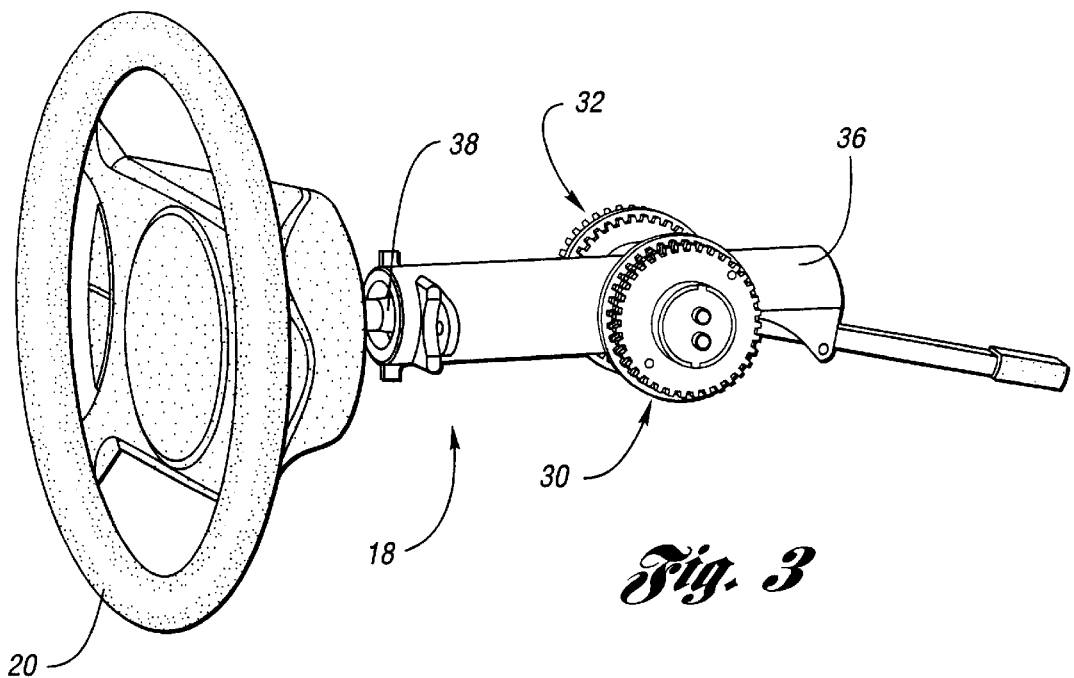
FIG. 3 shows a perspective view of a partially disassembled steering column armature assembly in accordance with the present invention.
Figure 4:
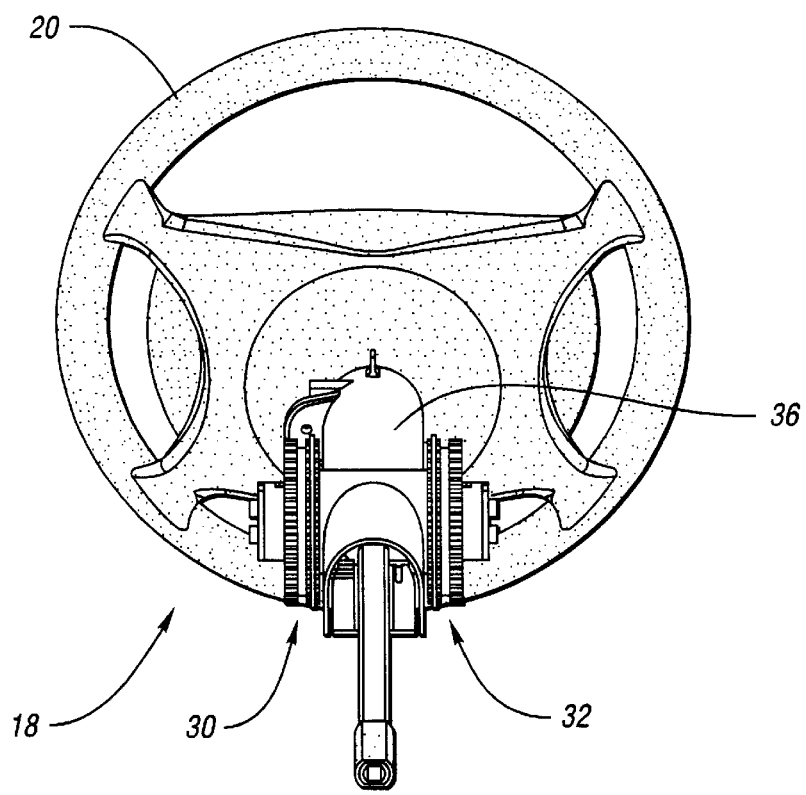
FIG. 4 shows an end perspective view of the assembly of FIG. 3.
Figure 5:
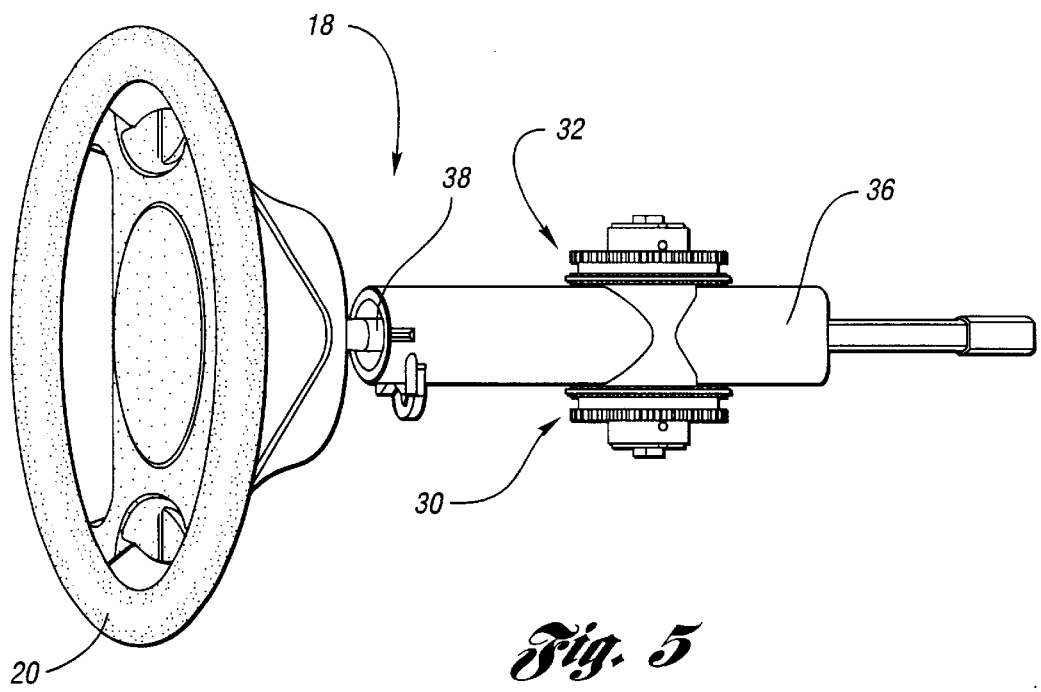
FIG. 5 shows a top perspective view of the assembly of FIG. 3.
Figure 6:
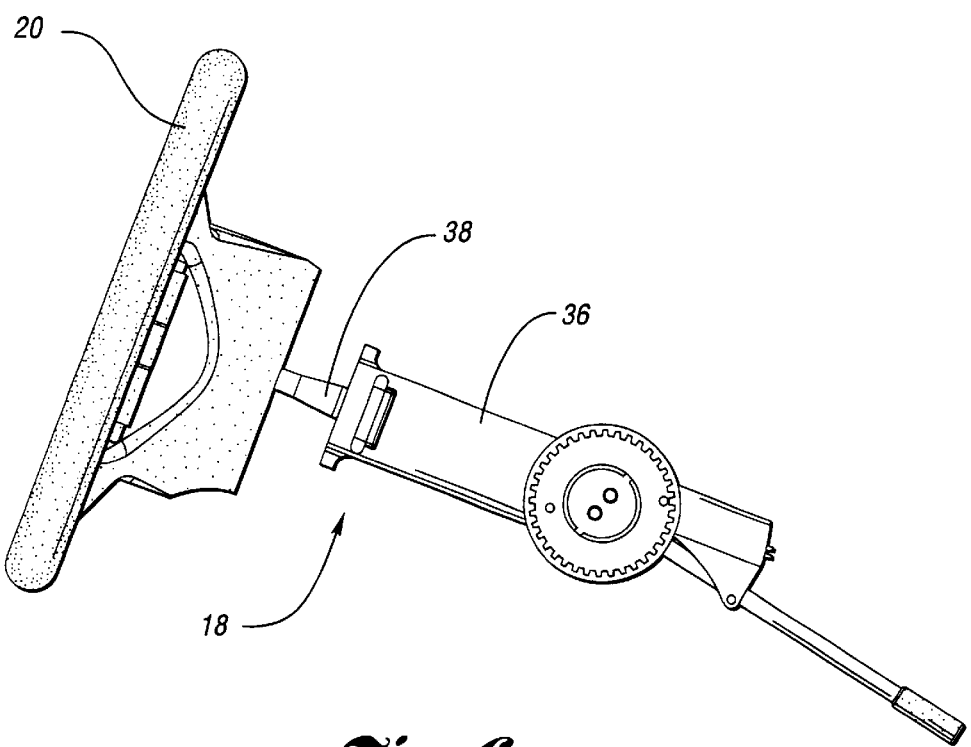
FIG. 6 shows a side view of the assembly of FIG. 3.

In the preferred embodiment of the invention shown in FIG. 2, a partially disassembled steering column armature assembly 18 is shown prior to installation within an aperture 22 formed in the cross-car beam 16. Preferably, the cross-car beam 24 is a cast component, wherein the aperture 22 is cast integrally therein, and the gear racks 26,28 are formed on upper and lower sides of the aperture 22. The gear racks 26,28 at the upper and lower edges of the aperture 22 are configured to engage the gear sets 30,32 of the steering column armature assembly 18 such that the steering column armature assembly 18 may be telescopically adjusted with respect to the aperture 22 by moving the gear sets 30,32 along the gear racks 26,28. In this configuration, a single gear of the gear sets 30,32 may act as a single attachment component for directly connecting the pivot joint 34 of the partially disassembled steering column armature assembly 18 to the cross-car beam 16.

FIGS. 3–6 show various views of the partially disassembled steering column armature assembly 18, which includes the gear sets 30,32 and armature 36 which houses the steering column 38.

Figure 15:
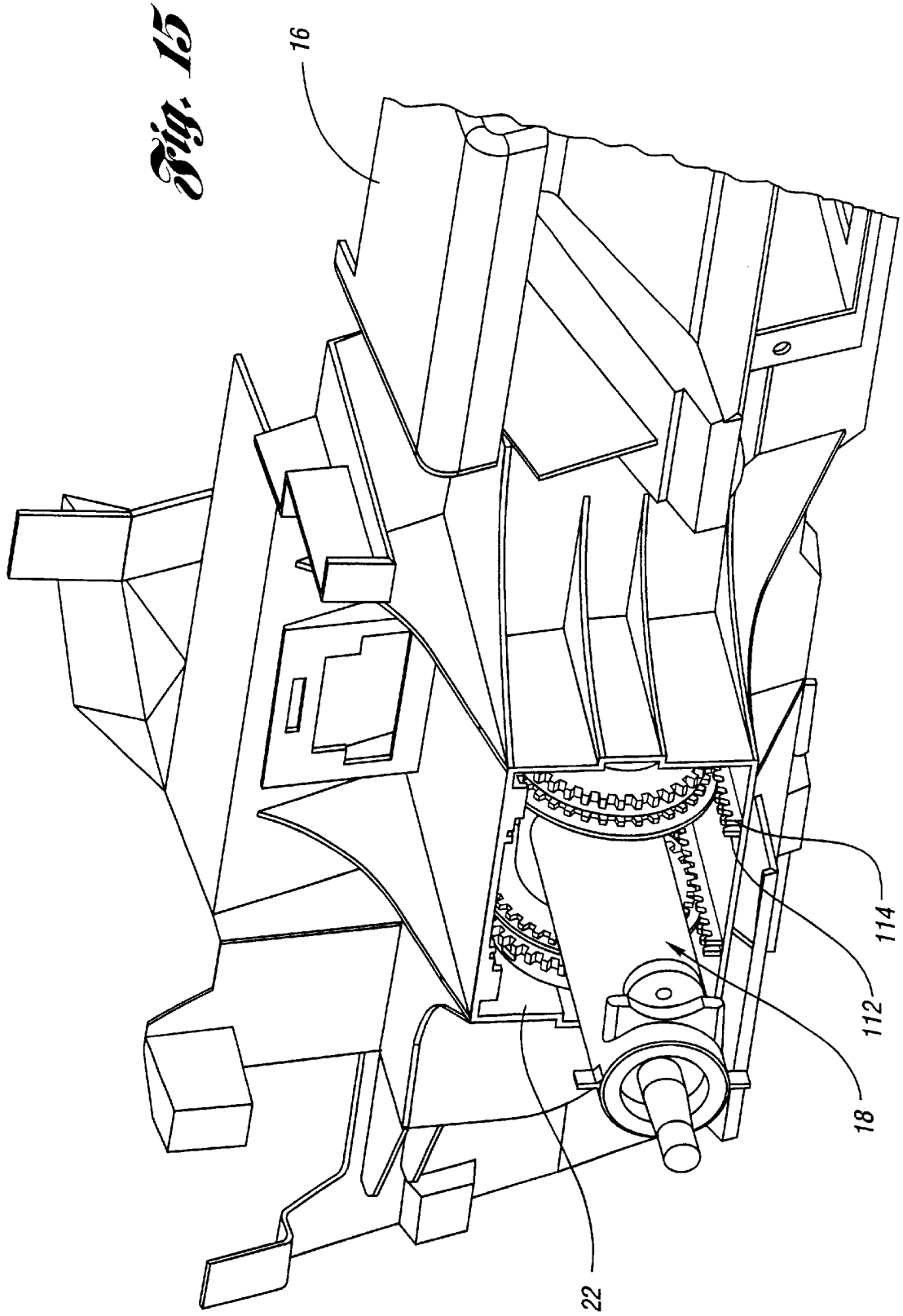
FIG. 15 shows a partial perspective view of the steering column armature assembly shown in FIG. 7 received within the cross-car beam structure shown in FIG. 13.

FIGS. 7–10 show the fully assembled steering column armature assembly 18. As shown, the steering column armature assembly 18 includes a housing 40 having rollers 42,44,46 for rolling movement within the aperture 22 of the cross-car beam 16, as shown in FIG. 15. The steering column armature assembly 18 shown in FIGS. 7–10 is a self-contained assembly, including tilting, telescoping and energy absorption features incorporated therein. The steering column armature 36 is pivotable about the pivot joint 34 when unrestricted by the tilt locking feature 50, to be described below. Also, the entire steering column armature assembly is movable along the aperture 22 for telescoping adjustment when unrestricted by the telescope locking feature 52, which is incorporated within the gear sets 30,32, to be described below.

A single bail handle 54 is operatively connected to the tilt locking feature 50 and to the telescope locking feature 52 for selectively disengaging the tilt locking feature and telescope locking feature for adjustment of the steering column 38.

FIG. 11 shows an exploded view of various instrument panel and column components, including the upper instrument panel substrate 56 and lower instrument panel substrate 58, which cooperate to enclose the cross-car beam 16. Also, a grommet 60 and shroud assembly 62 are provided for enclosing the steering column assembly.

Figure 12:
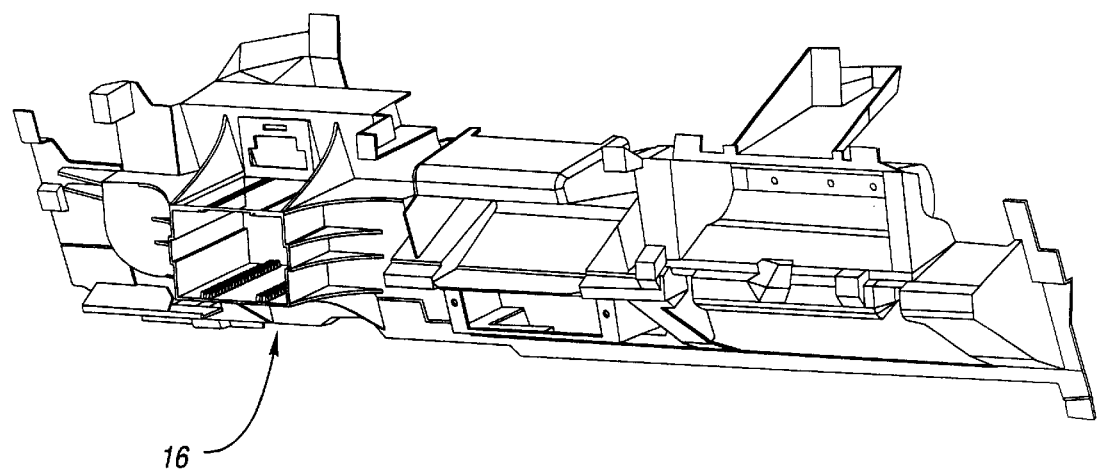
FIG. 12 shows a perspective view of a cross-car beam in accordance with the present invention.
Figure 13:
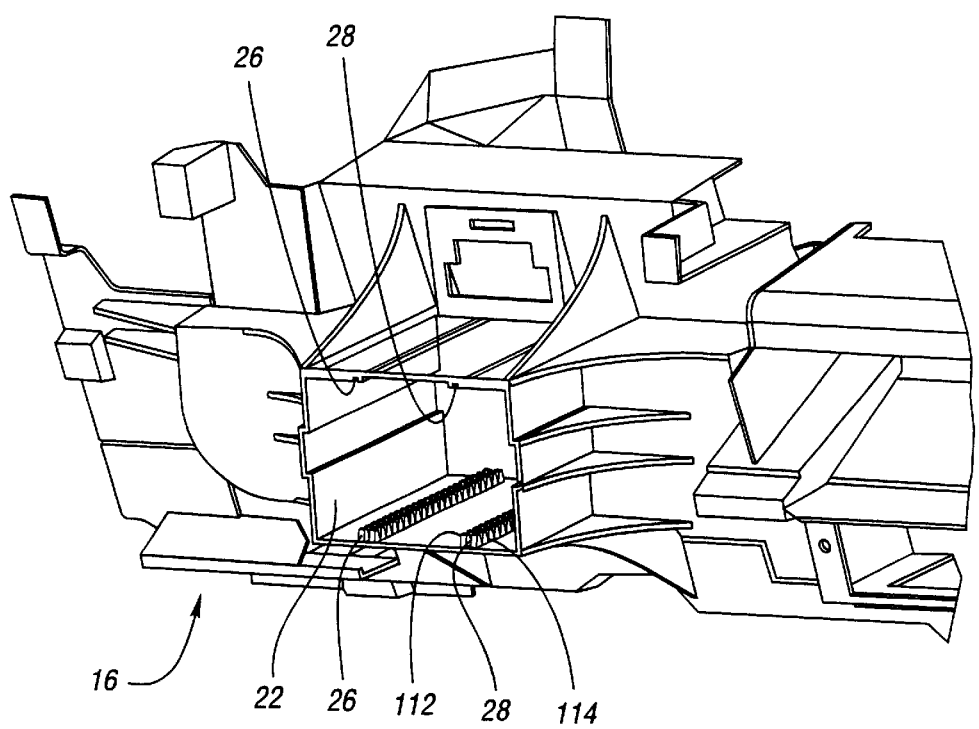
FIG. 13 shows an enlarged partial perspective view of the cross-car beam shown in FIG. 12.

FIGS. 12 and 13 show additional perspective views of the cross-car beam 16. In FIG. 13, the upper and lower gear racks 26,28 of the aperture 22 are clearly visible.

Figure 14:
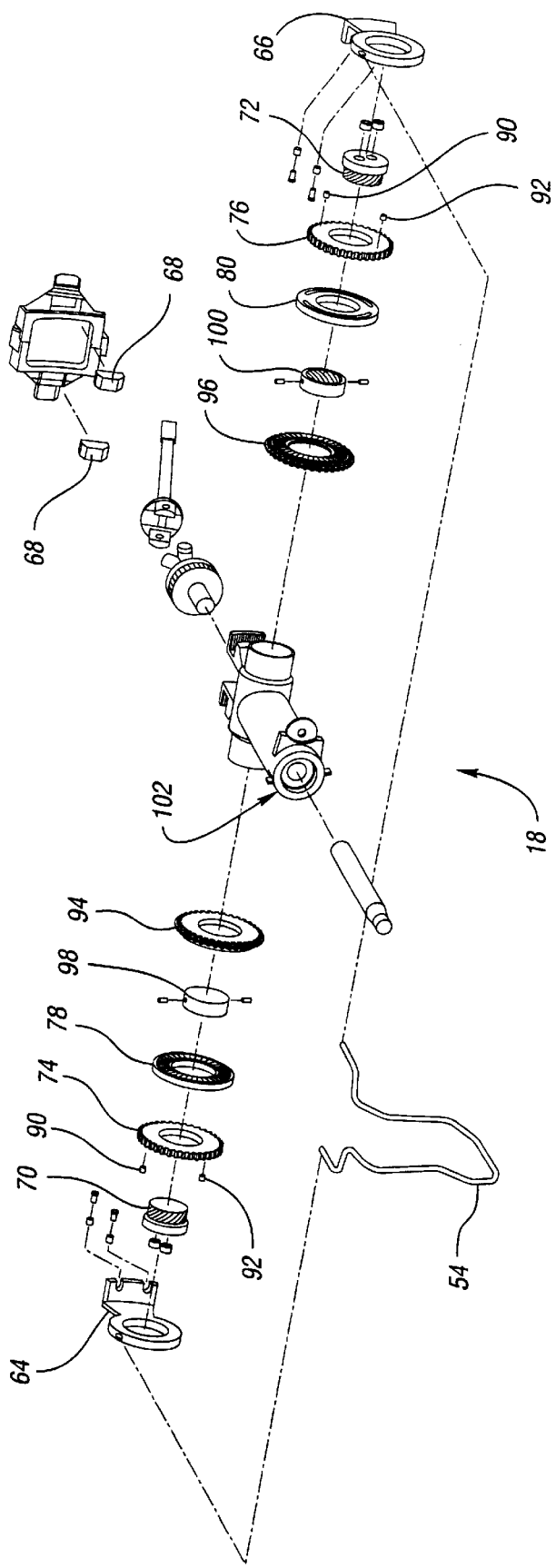
FIG. 14 shows an exploded view of the assembly as shown in FIG. 7.
Figure 24:
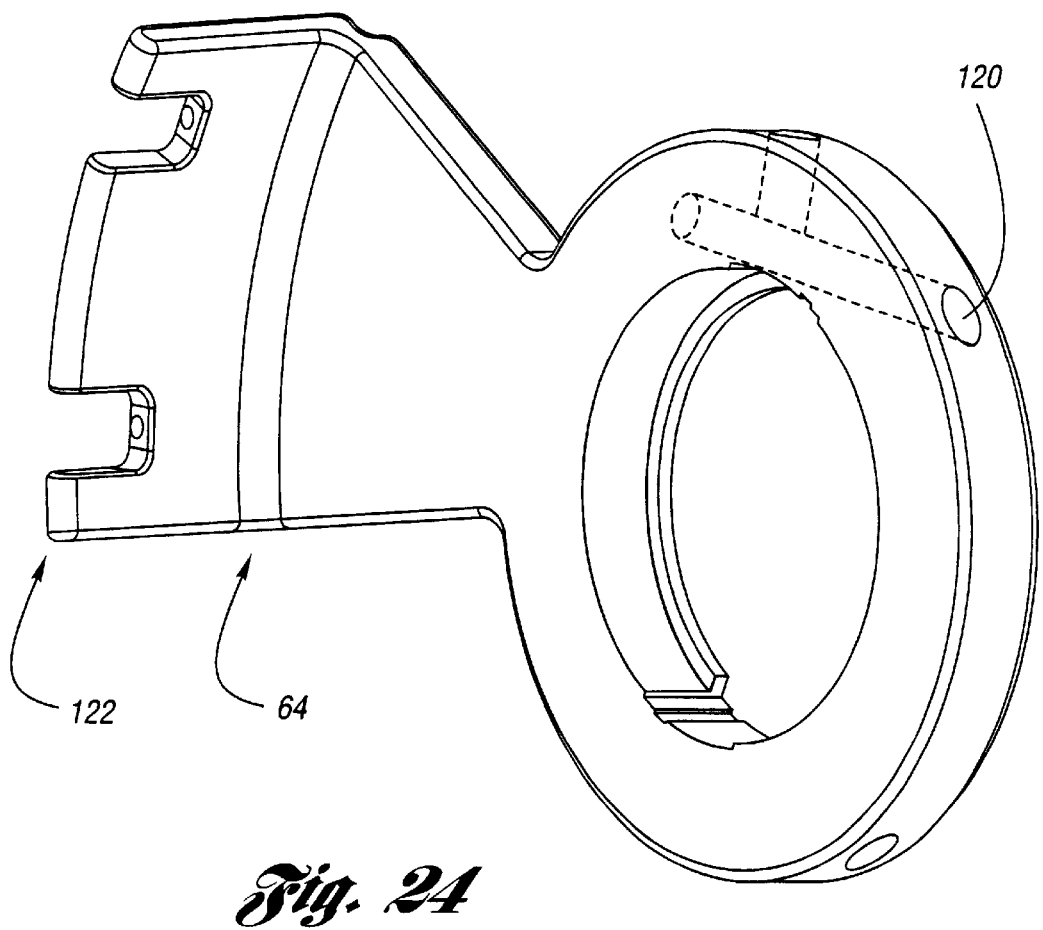
FIG. 24 shows a perspective view of a tilt locking feature in accordance with the present invention.
Figure 25:
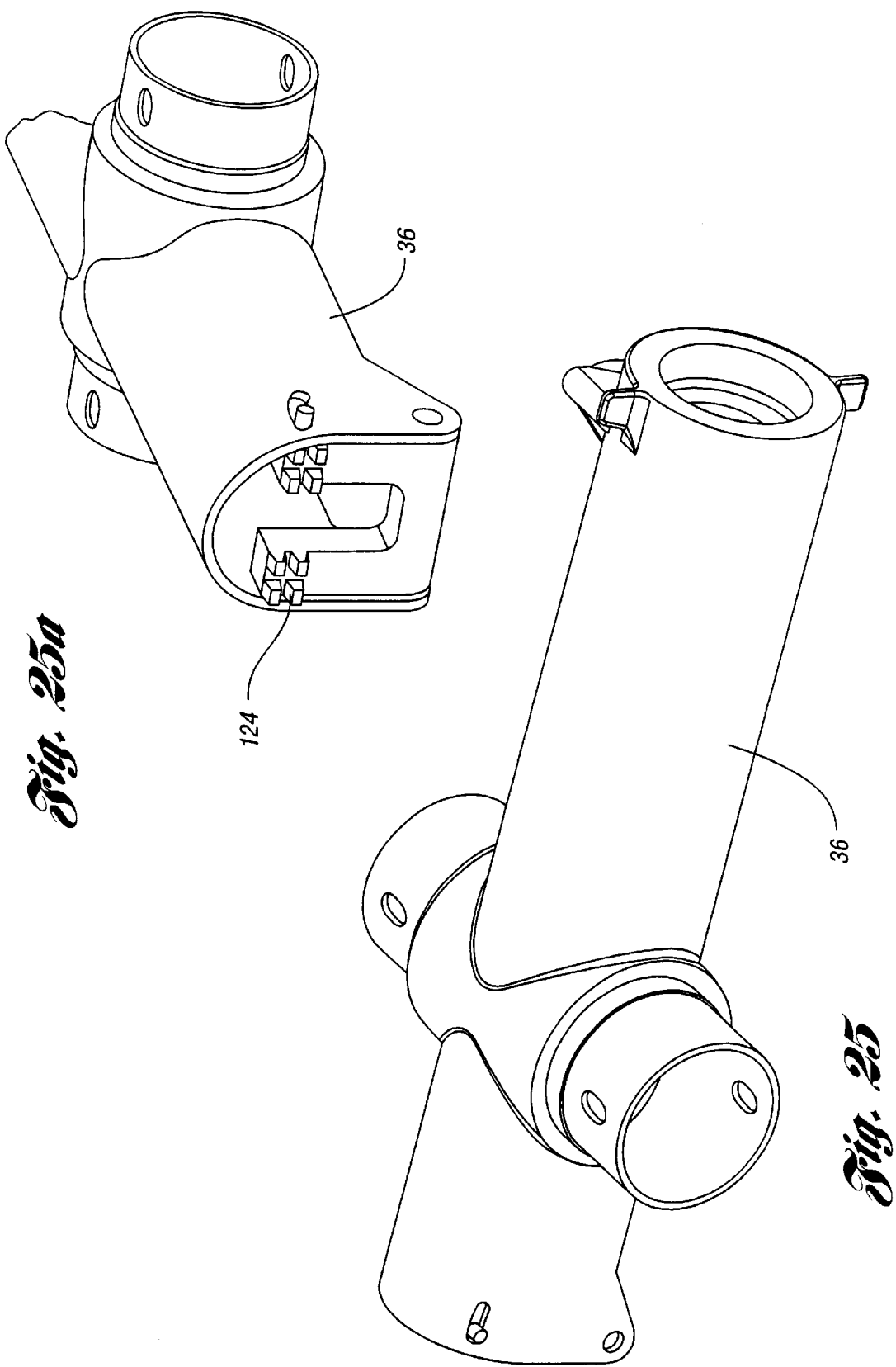
FIG. 25 shows a perspective view of a steering column armature in accordance with the present invention.
Figure 26:
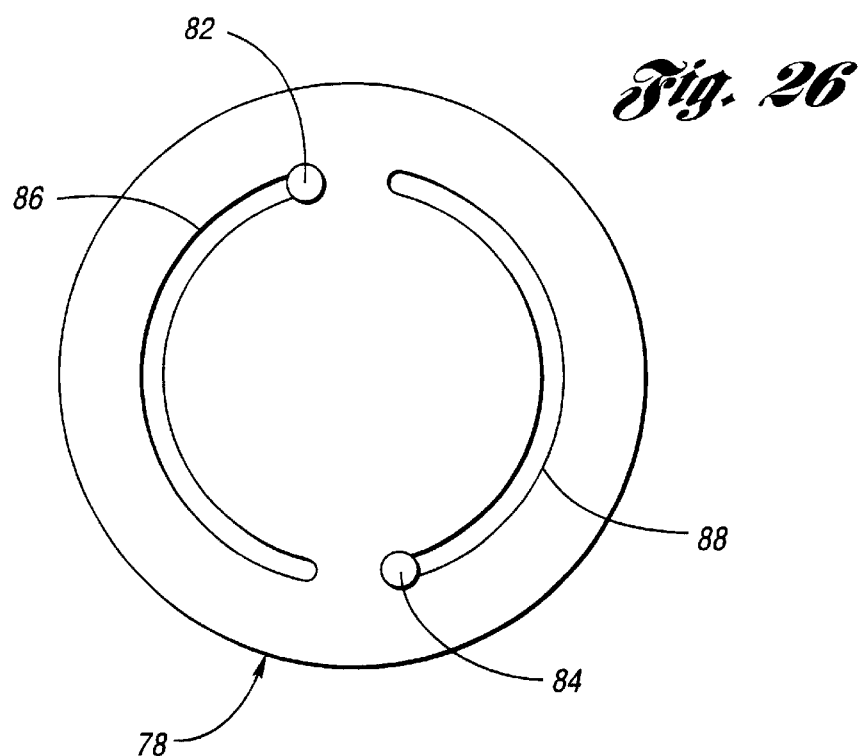
FIG. 26 shows a plan view of a clutch in accordance with the present invention.

The functionality of the steering column armature assembly 18 is most clearly understood with reference to the exploded view of FIG. 14. The single handle 54 is connected to the actuator locks 64,66, which cooperate with the bulkhead stabilizer teeth 68 to form the tilt locking feature 50. As shown in FIG. 24, the actuator lock 64 has an aperture 120 for receiving the single handle 54, and a locking end 122 which cooperates with the lock teeth 124 and stabilizer teeth 68 of the armature assembly 36, shown in FIG. 25, to form the tilt locking feature 50. The hub drivers 70,72 are connected to the respective first gears (outer gears) 74,76, respectively, and to the actuator locks 64,66. A clutch 78,80 is secured to each first gear 74,76. As shown in FIG. 26, each clutch 78,80 includes two enlarged holes 82,84 with corresponding energy dissipating slots 86,88. Pins extending from the respective first gear 74,76 engage within the holes 82,84, and are forced through the energy dissipating slots 86,88 in a crash situation for energy dissipation when the clutch 78,80 is forced to rotate with respect to the respective first gear 74,76. The pins 90,92 engageable within the holes 82,84 are shown in FIG. 14.

Figure 22:
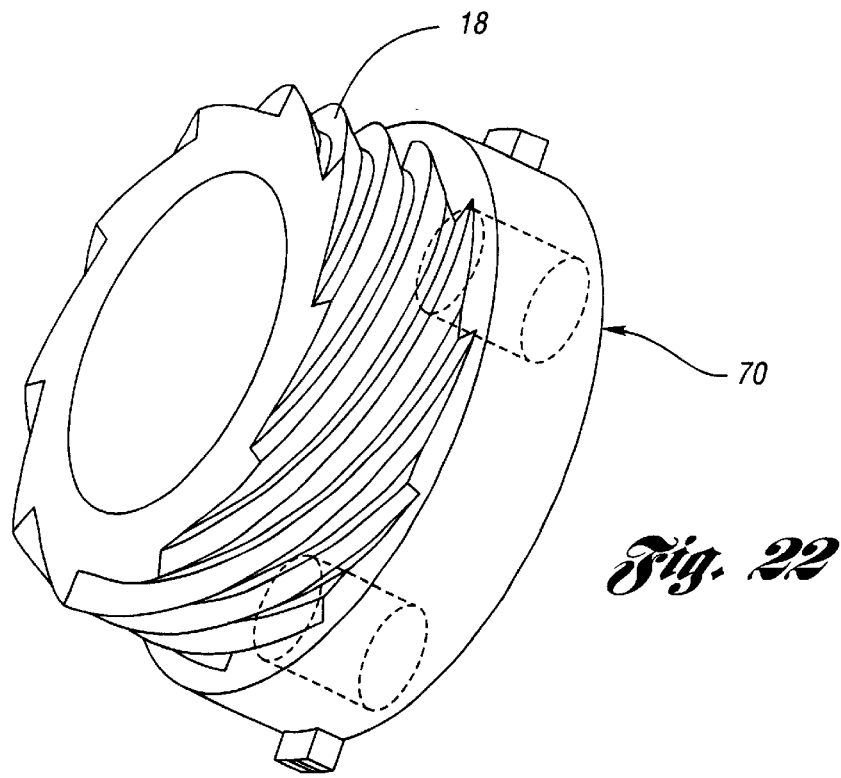
FIG. 22 shows a perspective view of a hub driver in accordance with the present invention.
Figure 23:
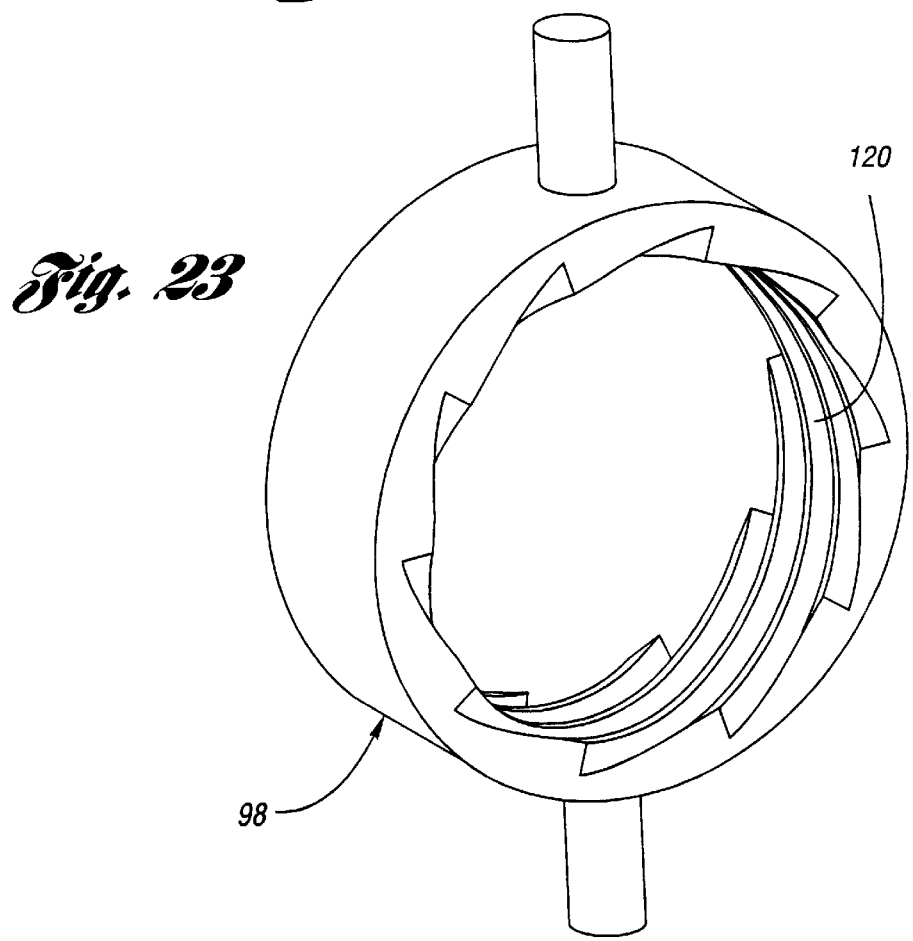
FIG. 23 shows a perspective view of a driven hub engageable with the hub driver of FIG. 22.

The second gears (inner gears) 94,96 are attached to the driven hubs 98,100, and assembled to the armature 102. A hub driver 70 and driven hub 98 are shown in FIGS. 22 and 23. Severely canted mating threads 118,120 are provided to enable the fast lead operation. Preferably, the hub driver 70 and driven hub 98 are molded components.

When the single handle 54 is rotated approximately 20 degrees, the actuator locks 64,66 and fast lead hub drivers 70,72 also rotate 20 degrees. With this rotation, the driven hubs 98,100 move approximately 0.125 inch, taking the inner gears 94,96 with them. This unlocks the actuator locks 64,66 from the bulkhead stabilizer teeth 68. At this point, only column tilt can be adjusted.

When the single handle 54 is rotated approximately 20 degrees more for a total of 40 degrees, the actuator locks 64,66 and fast lead screw hub drivers 70,72 also rotate 20 degrees more. With this rotation, the driven hubs 98,100 move approximately 0.125 inch more, taking the inner gears 94,96 with them. The tilt feature is re-locked at this point and, as shown in FIG. 18, the side teeth 104 of the inner gear 94 are now spaced away from the side teeth 106 of the clutch 78, thereby allowing free counter-rotation of the inner gear 94 with respect to the attached clutch 78 and outer gear 74. This counter-rotation is facilitated by the inner gear 94 being engaged only with the rack 28 at the bottom 108 of the aperture 22, and the outer gear 74 being engaged only at the rack 28 at the top 110 of the aperture 22. The opposite edge of each of the gears 74,94 is provided with clearance from the opposing aperture wall. Accordingly, with the gear teeth of the inner gear 94 only engaged at the bottom, and the gear teeth of the outer gear 74 only engaged at the top, telescoping movement of the steering column assembly occurs by means of counter-rotation of the gears 74,94. At this point of 40 degrees of handle 54 movement, only column telescope can be adjusted.

Figure 16:
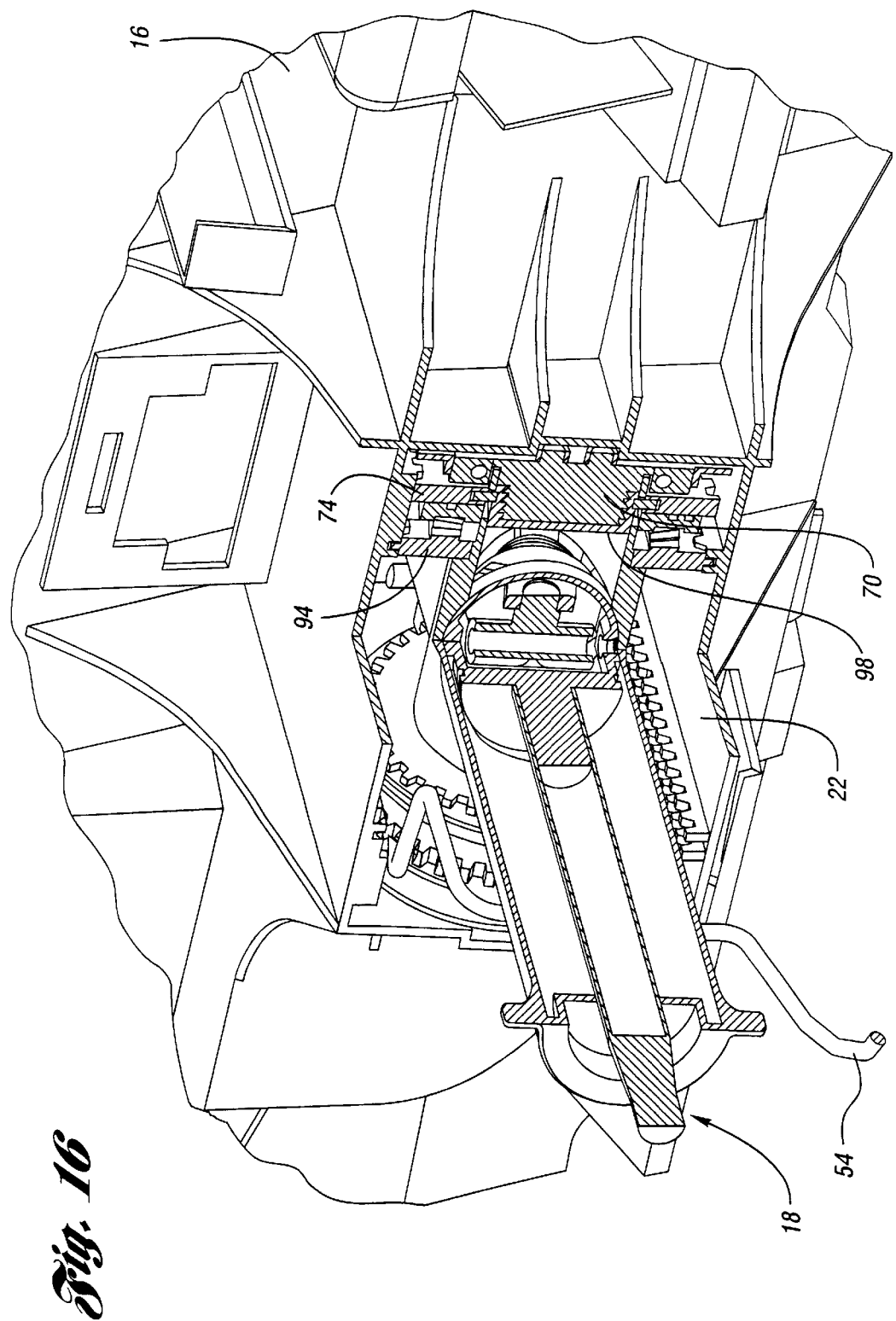
FIG. 16 shows a cut-away perspective view of the assembly of FIG. 15 with the telescope assembly in the unlocked position.
Figure 17:
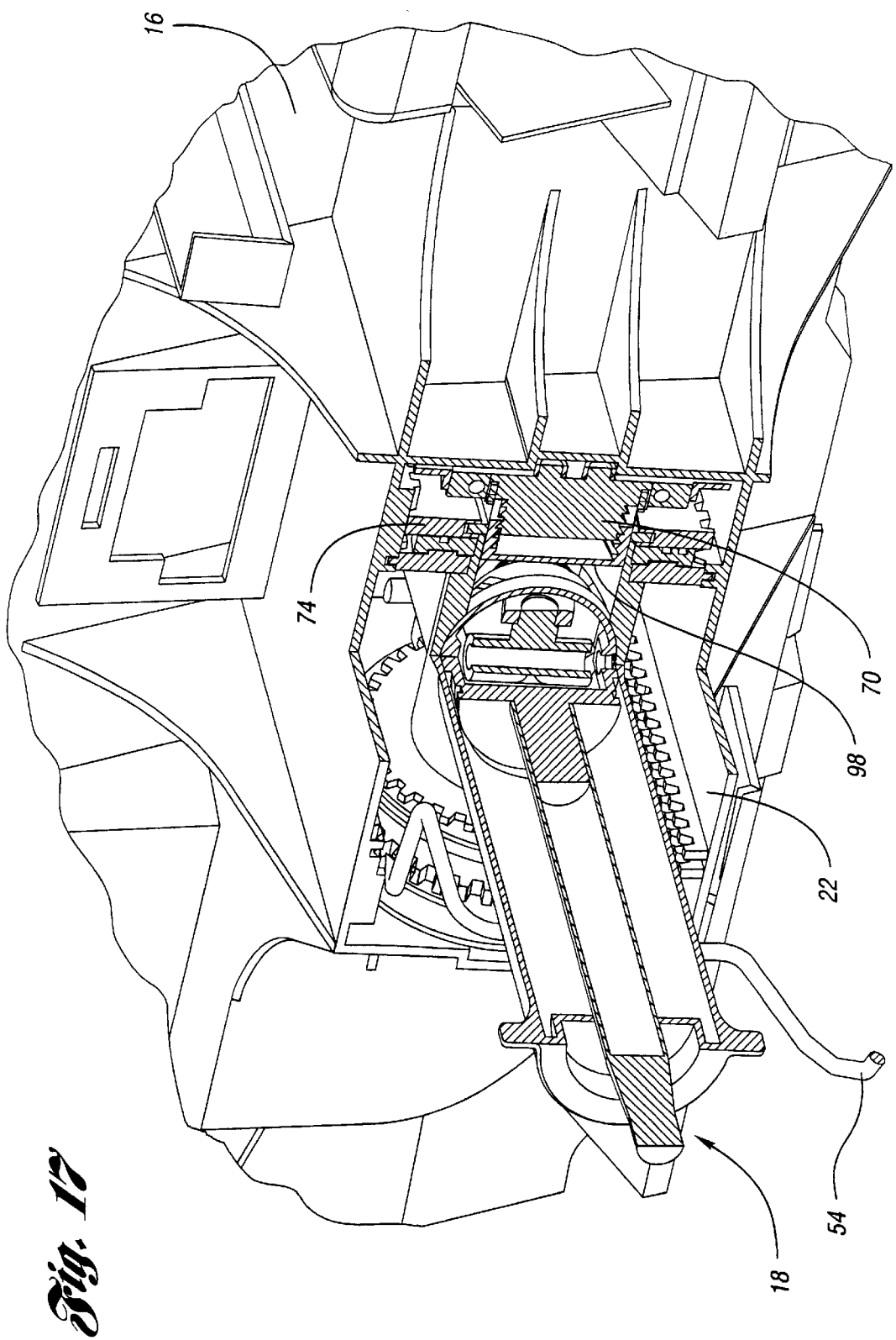
FIG. 17 shows a cut-away perspective view of the assembly of FIG. 15 with the telescope assembly in the locked position.

Moving the single handle 54 back 40 degrees reverses the hub drivers 70,72 and re-engages the side teeth 104,106 of the inner gear 94 and clutch 78, thereby locking in the newly-selected tilt and telescope positions. This locked position is shown in FIGS. 17 and 19, with FIGS. 16 and 18 illustrating the unlocked position. As shown in FIG. 19, the face teeth 104,106 of the inner gear 94 and clutch 78 are engaged, thereby preventing counter-rotation of the inner gear 94 and outer gear 74, preventing telescoping movement.

Returning to FIG. 13, the cross-car beam aperture 22 (receiver box) includes the gear racks 26,28. As shown, each gear rack 26,28 includes an outer row 114 and inner row 112 of teeth. The outermost teeth 114 engage the outer gear 74 at the bottom of the aperture 22, and the innermost teeth 112 engage the inner gear 94 at the top of the aperture 22. This gear arrangement stabilizes the column assembly.

Figure 20:
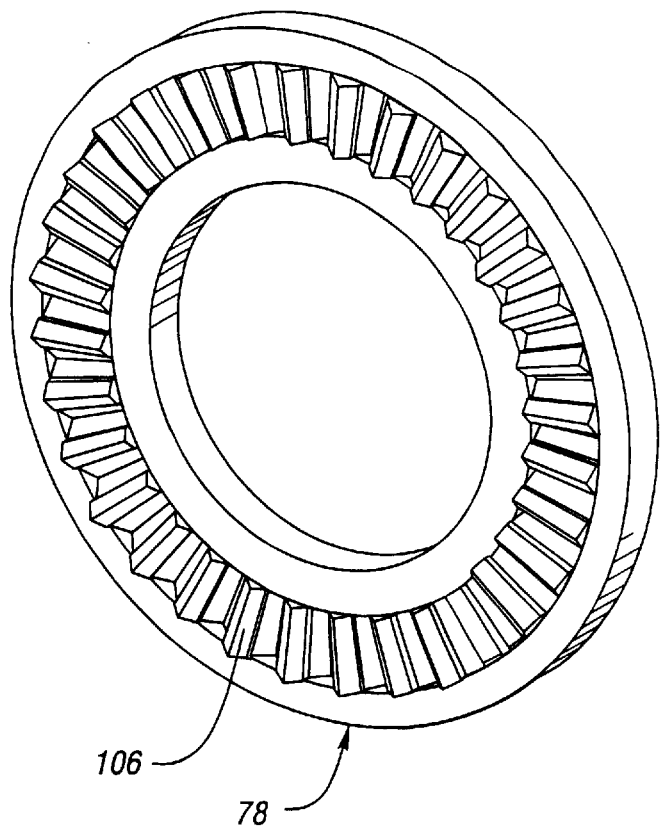
FIG. 20 shows a perspective view of a clutch in accordance with the present invention.
Figure 21:
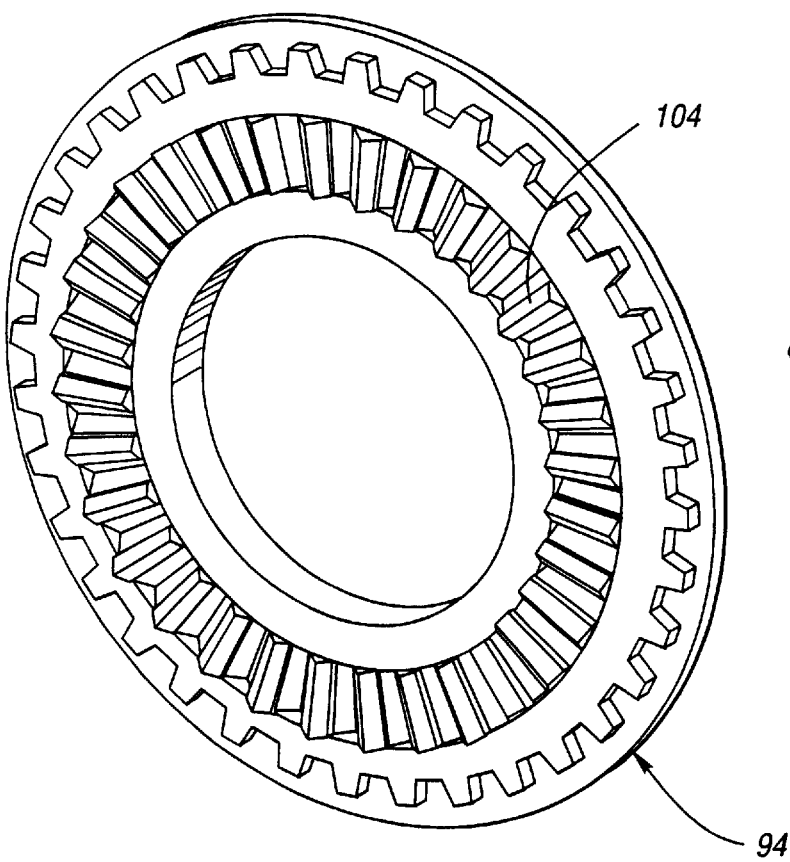
FIG. 21 shows a perspective view of a second gear engageable with the clutch of FIG. 20.

During the crash event, the side teeth 104,106 of the inner gear 94 and clutch 78 prevent relative rotation between the clutch 78 and inner gear 94. The engaging side teeth 104,106 of inner gear 94 and the clutch 78 are shown in FIGS. 20 and 21. However, the clutch 78 is pinned to the outer gear 74 by the pins 90,92 shown in FIG. 14. Turning to FIG. 26, the pins 90,92 engage within the holes 80,82 of the clutch 78. The holes 82,84 are larger than the corresponding slots 86,88, therefore the pins 90,92 stay in position under normal conditions. However, in a crash situation, the weak point is the energy dissipation slots 86,88 on the clutch 78. When sufficient axial force is exerted on the steering column, the outer gear 74 forcibly counter-rotates with respect to the inner gear 94, and the pins 90,92 deform the slots 86,88 of the clutch 78 and dissipate the energy. In an alternative embodiment, the pins 90,92 and slots 86,88 may be replaced with a pair of wires which are cold-formed by dragging the wires through bent slots during the crash event.

Figure 27:
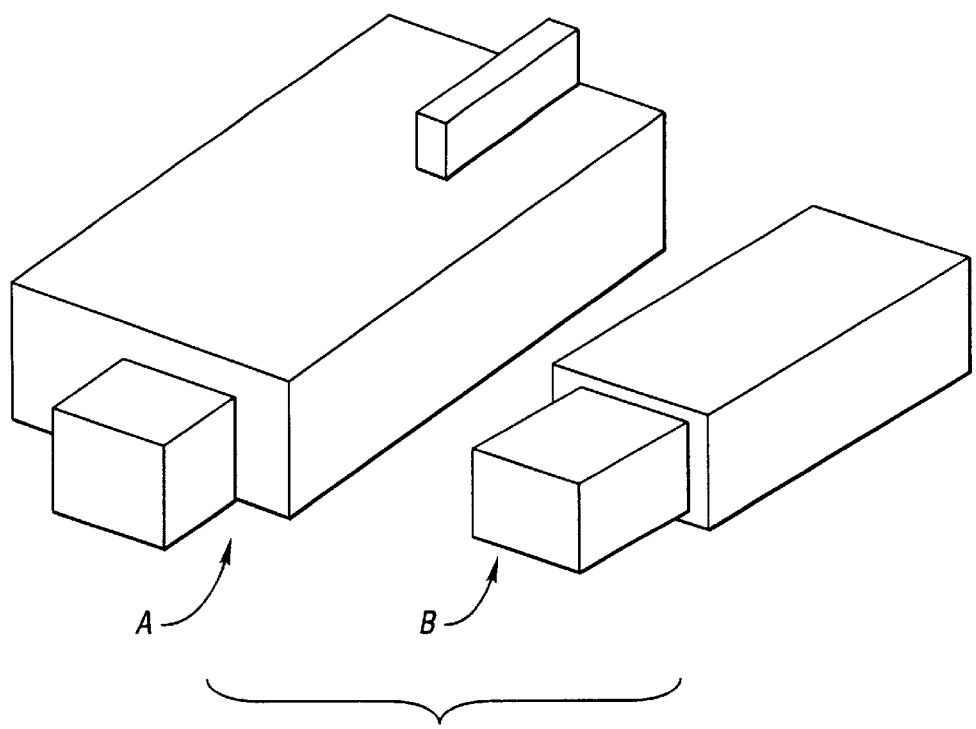
FIG. 27 shows a comparative schematic illustration of packaging space required by a prior art steering column assembly in comparison with the present invention.

FIG. 27 is a schematic illustration of the packaging space required by a sample prior art steering column assembly A in comparison with the packaging space required by the present steering column assembly B. As shown, the invention provides significant packaging space savings by incorporating tilt, telescope and energy dissipation features in the removable steering column armature assembly.

While the best mode for carrying out the invention has been described in detail, those familiar with the art to which this invention relates will recognize various alternative designs and embodiments for practicing the invention within the scope of the appended claims.

What is claimed is:

1. A vehicle comprising:
    a receiver positioned in the vehicle and having an aperture formed therein with first and second gear racks at opposing sides of the aperture;
    a steering column armature assembly received within the receiver aperture and including first and second gears engaged with said first and second gear racks, respectively, in a manner to facilitate counter-rotation of the first and second gears as the steering column armature assembly is moved along the first and second gear racks, and wherein said first and second gears are selectively lockable together to prevent movement of the steering column armature assembly along the first and second gear racks; and
    wherein said first and second gears include an energy absorber positioned therebetween for dissipating energy when the first and second gears are forcibly displaced and counter-rotate with respect to each other in a high energy impact.

2. The vehicle of claim 1, further comprising a clutch positioned between said first and second gears, and wherein said energy absorber comprises a pin extending from one of said gears and cooperating with a slot formed in said clutch, said slot having a width less than the width of said pin, whereby forced counter-rotation of the first and second gears causes the pin to be dragged through the slot which forcibly widens the slot, thus dissipating impact energy.

3. The vehicle of claim 1, wherein said first and second gears are axially movable toward each other for locking and away from each other for unlocking.

4. The vehicle of claim 3, wherein at least one of said first and second gears includes side teeth facing the other of said first and second gears for locking.

5. The vehicle of claim 2, wherein said clutch is fixed to one of the first and second gears and includes clutch side teeth for locking onto the other of the first and second gears.

6. The vehicle of claim 5, wherein said clutch comprises a plastic material.

7. A vehicle steering column assembly comprising:
    a receiver forming an aperture therein and having first and second gear racks at opposing sides of the aperture;
    a steering column armature assembly received within the receiver aperture for sliding movement along the opening and including at least one gear engaged with said gear rack, said gear being rotatable as the steering column armature assembly slides along the aperture and lockable to prevent sliding movement along the aperture; and
    wherein said steering column aperture assembly includes an energy absorber which is movable with the steering column armature assembly for dissipating energy when said at least one gear is forcibly rotated along the gear rack and rotates along the gear rack in a high energy impact.

8. The vehicle steering column assembly of claim 7, wherein said at least one gear rack comprises first and second gear racks positioned at opposing sides of the aperture, said at least one gear comprises first and second gears engaged with the first and second gear racks, respectively, in a manner to facilitate counter-rotation of the first and second gears as the steering column armature assembly is moved along the aperture, and said first and second gears being lockable to each other to prevent movement of the steering column armature assembly along the aperture; and
    wherein said energy absorber is positioned between the first and second gears for dissipating energy when the first and second gears are forcibly rotated along the gear rack and counter-rotate with respect to each other.

9. The vehicle steering column assembly of claim 8, further comprising a clutch positioned between said first and second gears, and wherein said energy absorber comprises a pin extending from one of said gears and cooperating with a slot formed in said clutch, said slot having a width less than the width of said pin, whereby forced counter-rotation of the first and second gears causes the pin to be dragged through the slot which forcibly widens the slot, thus dissipating impact energy.

10. A vehicle comprising:
    a receiver forming an aperture therein and having first and second gear racks at opposing sides of the aperture;
    a steering column armature assembly received within the receiver aperture and including first and second gears engaged with said first and second gear racks, respectively, in a manner to facilitate counter-rotation of the first and second gears as the steering column armature assembly is moved along the first and second gear racks, and wherein said first and second gears are selectively lockable together to prevent movement of the steering column armature assembly along the first and second gear racks;
    wherein said first and second gears include an energy absorber positioned therebetween for dissipating energy when the first and second gears are rotated along the gear rack and counter-rotate with respect to each other in a high energy impact; and
    wherein said first and second gears are axially movable toward each other for locking and away from each other for unlocking.

\* \* \* \* \*